United States Patent
Smrz (10) Patent No.: US 8,776,251 B2
(45) Date of Patent: Jul. 8, 2014

(54) DATA EXCHANGE BETWEEN A SECURE ELEMENT AND A TERMINAL

(75) Inventor: Petr Smrz, Brno (CZ)

(73) Assignee: T-Mobile Czech Republic A. S., Praha (CZ)

( * ) Notice: Subject to any disclaimer, the term of this patent is extended or adjusted under 35 U.S.C. 154(b) by 0 days.

(21) Appl. No.: 13/592,537

(22) Filed: Aug. 23, 2012

(65) Prior Publication Data

US 2013/0174266 A1 Jul. 4, 2013

(30) Foreign Application Priority Data

Aug. 24, 2011 (EP) ..................................... 11006914

(51) Int. Cl.
| | |
|---|---|
| *G06F 21/00* | (2013.01) |
| *G06F 21/10* | (2013.01) |
| *G06F 21/60* | (2013.01) |
| *H04L 29/06* | (2006.01) |
| *G06F 21/62* | (2013.01) |

(52) U.S. Cl.
CPC .............. *G06F 21/10* (2013.01); *G06F 21/60* (2013.01); *H04L 63/0428* (2013.01); *G06F 21/6218* (2013.01)
USPC ........................................... 726/26; 713/189

(58) Field of Classification Search
CPC ..... G06F 21/10; G06F 21/60; G06F 21/6218; H04L 63/0428
USPC ........................................... 726/26; 713/189
See application file for complete search history.

(56) References Cited

U.S. PATENT DOCUMENTS

| | | | |
|---|---|---|---|
| 2008/0107041 A1* | 5/2008 | Liu | 370/252 |
| 2010/0207742 A1* | 8/2010 | Buhot et al. | 340/10.51 |

OTHER PUBLICATIONS

GlobalPlatform: "GlobalPlatform Card Contactless Service Card Specification v2.2—Amendment C Version 1.0." Feb. 1, 2010. pp. 1-78.*
European Patent Office, Extended European Search Report in European Patent Application No. 11 00 6914 (Feb. 16, 2012).
Globalplatform: "GlobalPlatform Card Contactless Services Card Specification v2.2—Amendment C Version 1.0—Document Reference: GPC_SPE_025", Feb. 1, 2010, p. 1-78.
Simalliance Interoperability Working Group: "Mobile Near Field Communication (Mobile NFC) Stepping Stones Version 1.0.0", Jun. 15, 2011, p. 1-82.

* cited by examiner

*Primary Examiner* — Philip Chea
*Assistant Examiner* — Kendall Dolly
(74) *Attorney, Agent, or Firm* — Leydig, Voit & Mayer, Ltd.

(57) ABSTRACT

A method for data exchange between a secure element and a terminal, the secure element including a CRS (Contactless Registry Service) application, a CREL (Contactless Registry Event Listener), and at least one service application, the terminal including a SEUI (Secure Element User Interface) configured to interact with at least one out of the CRS application, the CREL application, or the service application, includes exchanging, between the secure element and the terminal, an STID (Service Type Identification) information relating to the at least one service application. The STID information indicates the service type of the at least one service application of a predetermined set of different service types.

9 Claims, 4 Drawing Sheets

DATA EXCHANGE BETWEEN A SECURE ELEMENT AND A TERMINAL

CROSS-REFERENCE TO RELATED APPLICATIONS

This patent application claims priority to European Patent Application EP 11 006 914.3, filed on Aug. 24, 2011, which is hereby incorporated by reference herein.

FIELD

The present invention relates inter alia to a method for data exchange between a secure element and a terminal. Furthermore, the invention also relates to a secure element for exchanging data with a terminal, and to a terminal for exchanging data with a secure element.

BACKGROUND

A secure element is a smart object that is intended to communicate with its environment. In particular, the secure element may cooperate with a terminal. A terminal may be a User Equipment such as a mobile phone or a PDA (personal digital assistant) or another mobile device.

Over the past years "contactless", or near field communications (NFC), has quickly gained popularity and many contactless services are now commercially deployed. Public transport schemes all over the world use contactless systems and contactless payments look set to follow. NFC typically uses a smart card in "credit card" form factor. Other smart card formats are available: of particular interest in the mobile telecommunications is the ubiquitous UICC (Universal Integrated Circuit Card) often referred to as the SIM card (Subscriber Identity Module card).

A much-discussed extension to NFC is to replace the "credit card" form factor card used in existing contactless services by a mobile phone handset containing a Secure Element such as the SIM card.

Mobile NFC takes advantage of the fact that users typically already carry a mobile phone handset and consider mobiles as personal and trusted. In one mobile handset, a user could, in principle, replace numerous physical "contactless" cards.

A cornerstone of the Mobile NFC is that all security and NFC functionality is controlled by the Secure Element. In this regard, it is noted that the SIM is the widest available deployed portable and standardized security element with more than 2 billion users worldwide. It is therefore highly desirable to use the existing SIM platform rather than to introduce a new secure element to the phone. Furthermore, the SIM is removable and users can maintain their applications and data from one NFC enabled mobile device to another. However, according to the present invention, other solutions of a secure element are possible besides the SIM card.

The use of NFC requires communication protocols between applications hosted by the secure element and applications hosted outside of the secure element, typically hosted by a terminal. Typically, different applications using NFC functionality require different user interfaces or at least comprise proprietary elements in the definition of the interface of the application. Furthermore, each service application that aims at exposing a user interface needs to deploy its own user interface for all the possible terminal platforms it wishes to cover. Therefore, users can have a very different experience that can be dependent on the service provider and/or on the user interface logic. In case a user wants to swap the secure element (e.g. the SIM card), it is possible that the user interface part of the terminal potentially does not match the environment of the secure element. Therefore, it would be desirable to provide standardized communication protocols, especially a common language, for data exchange between the secure element and the terminal.

SUMMARY

In an embodiment, the present invention provides a method for data exchange between a secure element and a terminal. The secure element includes a CRS (Contactless Registry Service) application, a CREL (Contactless Registry Event Listener), and at least one service application. The terminal includes a SEUI (Secure Element User Interface) configured to interact with at least one out of the CRS application, the CREL application, or the service application. The method includes: exchanging, between the secure element and the terminal, an STID (Service Type Identification) information relating to the at least one service application. The STID information indicates the service type of the at least one service application of a predetermined set of different service types.

DETAILED DESCRIPTION

In an embodiment, the present invention provides a method for data exchange between a secure element and a terminal such that one and the same user interface is possible to realize easily and quickly for all the possible terminal platforms an application wants to cover, and to provide a common language of communication between a terminal providing the user interface and a service application on a secure element.

In an embodiment, the present invention provides a method for data exchange between a secure element and a terminal, wherein the secure element comprises
  a CRS application (Contactless Registry Service application),
  a CREL application (Contactless Registry Event Listener application), and
  at least one service application,
and wherein the terminal comprises a SEUI (Secure Element User Interface) interacting with at least one out of the CRS application, the CREL application and the service application, wherein a STID (Service Type Identification) information, relating to the at least one service application, is exchanged between the secure element and the terminal, wherein the STID information indicates the service type of the at least one service application out of a predetermined set of different service types.

According to the present invention it is thereby advantageously possible, that an easy and transparent communication can simply be realized between the terminal and the secure element.

It is preferred according to the present invention, that the secure element comprises a further service application besides the at least one service application wherein a further STID (Service Type Identification) information, relating to the further service application, is exchanged between the secure element and the terminal, wherein the further STID information indicates the service type of the further service application out of a predetermined set of different service types.

Thereby it is advantageously possible, that a multitude of different services can be made available to a user of the secure element and the terminal.

Furthermore, it is preferred according to the present invention that the STID information and/or the further STID information is/are encoded by means of a service type bit-mask comprising a plurality of service type bits as a part of an AID (application ID) information, wherein each of the plurality of service type bits of the service type bit-mask relates to a service type.

Thereby, it is advantageously possible that a high degree of flexibility is possible to be realized, reflecting the different needs of the users.

Still furthermore, it is preferred according to the present invention that a set of a plurality of service types is defined for the at least one service application and/or for the further service application, wherein the set of service types comprises any combination of a maximum of thirty-two different service types.

Thereby, it is advantageously possible according to the present invention, that by using a comparably small number of different service types all required situations can be addressed.

According to yet another embodiment of the present invention, it is preferred that the STID information refers to one of the service types and/or the further STID information refers to one of the service types.

The present invention also relates to a secure element for data exchange with a terminal within which the secure element is located, wherein the secure element comprises
  a CRS application (Contactless Registry Service application),
  a CREL application (Contactless Registry Event Listener application), and
  at least one service application,
and wherein the terminal comprises a SEUI (Secure Element User Interface) interacting with at least one out of the CRS application, the CREL application and the service application, wherein the secure element is provided such that a STID (Service Type Identification) information, relating to the at least one service application, is exchanged between the secure element and the terminal, wherein the STID information indicates the service type of the at least one service application out of a predetermined set of different service types.

Furthermore, it is preferred according to the present invention—and with respect to the secure element—that the secure element comprises a further service application besides the at least one service application wherein the secure element is provided such that a further STID (Service Type Identification) information, relating to the further service application, is exchanged between the secure element and the terminal, wherein the further STID information indicates the service type of the further service application out of a predetermined set of different service types.

According to a further embodiment of the present invention—and with respect to the secure element—, it is preferred that the STID information and/or the further STID information is/are encoded by means of a service type bit-mask comprising a plurality of service type bits as a part of an AID (application ID) information, wherein each of the plurality of service type bits of the service type bit-mask relates to a service type.

Furthermore, it is preferred according to the present invention—and with respect to the secure element—that a set of a plurality of service types is defined for the at least one service application and/or for the further service application, wherein the set of service types comprises any combination of a maximum of thirty-two different service types.

According to a further embodiment of the present invention—and with respect to the secure element—, it is preferred that the STID information refers to one of the service types and/or the further STID information refers to one of the service types.

The present invention also relates to a terminal for data exchange with a secure element, wherein the secure element is located within the terminal, wherein the secure element comprises
  a CRS application (Contactless Registry Service application),
  a CREL application (Contactless Registry Event Listener application), and
  at least one service application,
and wherein the terminal comprises a SEUI (Secure Element User Interface) interacting with at least one out of the CRS application, the CREL application and the service application, wherein the terminal is provided such that a STID (Service Type Identification) information, relating to the at least one service application, is exchanged between the secure element and the terminal, wherein the STID information indicates the service type of the at least one service application out of a predetermined set of different service types.

Furthermore, it is preferred according to the present invention—and with respect to the terminal—that the secure element comprises a further service application besides the at least one service application wherein the secure element is provided such that a further STID (Service Type Identification) information, relating to the further service application, is exchanged between the secure element and the terminal, wherein the further STID information indicates the service type of the further service application out of a predetermined set of different service types.

According to a further embodiment of the present invention—and with respect to the terminal—, it is preferred that the STID information and/or the further STID information is/are encoded by means of a service type bit-mask comprising a plurality of service type bits as a part of an AID (application ID) information to simplify and speed up the SEUI access to the STID information, wherein each of the plurality of service type bits of the service type bit-mask relates to a service type.

Furthermore, it is preferred according to the present invention—and with respect to the terminal—that a set of a plurality of service types is defined for the at least one service application and/or for the further service application, wherein the set of service types comprises any combination of a maximum of thirty-two different service types.

Furthermore, the present invention relates to a program comprising a computer readable program code which, when executed on a computer, causes the computer to perform an inventive method according to the present invention.

The present invention also relates to computer program product for data exchange between a secure element and a terminal, the computer program product comprising a computer program stored on a storage medium, the computer program comprising program code which, when executed on a computer, causes the computer to perform an inventive method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
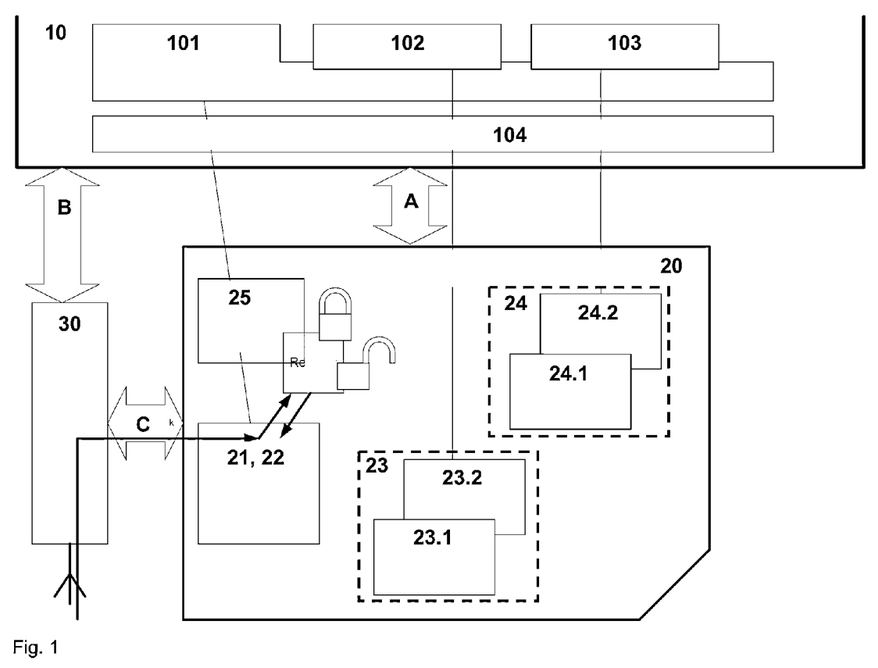
FIG. 1 schematically illustrates a conventional Global Platform environment of a secure element.

In FIG. 1, a conventional Global Platform environment of a secure element is schematically shown. A terminal 10 comprises a service management module 101 or service management unit 101. The service management module 101 comprises a first pluggable user interface module 102 for a first service application and a second pluggable user interface module 103 for a second service application. The terminal 10 communicates with a secure element 20, e.g., via an ISO 7816 link A and preferably using an ACP enforcer (Access Control Policy enforcer) 104 or a UICC capability certificate. The secure element 20 comprises a CRS application (Contactless Registry Service application) 21 and a CREL application (Contactless Registry Event Listener application) 22 as well as a service application 23 and a further service application 24. The service application 23 is also called first service application 23 and the further service application 24 is also called second service application 24. The first service application 23 on the secure element 20 communicates with the first pluggable user interface module 102 and the second service application 24 on the secure element 20 communicates with the second pluggable user interface module 103. The first service application 23 comprises a basic cardlet module 23.1 and a bank specific extended cardlet 23.2 providing features of or to the first pluggable user interface module 102. The second service application 24 comprises a basic cardlet module 24.1 and a bank specific extended cardlet 24.2 providing features of or to the second pluggable user interface module 103. This means that the individual service applications 23, 24 communicate with their respective user interfaces, i.e. the pluggable user interface modules 102, 103 in a proprietary fashion. Additionally, the CRS application 21 on the secure element 20 provides an application management functionality. This application management functionality can be queried to return a list of all service applications the CRS application 21 knows of The terminal 10 can also register to receive various events from the CRS application 21. Any user interface application 102, 103 can therefore list the registered service applications 23, 24, open a channel to any of them and start sending commands. The prerequisite here is that the respective user interface successfully passes security checks of the secure element environment given by Global Platform. The Global Platform standard is an initiative of global leaders of the financial services industry. It offers a standard framework for putting many different applications on any smart card-based personal device. Global Platform defines a way to guarantee the isolation and security of each application. This means the transport operator can control m-ticketing and the bank its payment application, while the mobile operator maintains complete control of its mobile services subscription. It also defines mechanisms for securely adding and removing these applications in the SIM device at any time. Therefore, the SIM card is divided into independent private spaces called security domains. Each service provider has its own security domain and maintains full control over it. In the example shown in FIG. 1, a Global Platform registry 25 is provided on the secure element 20. Furthermore in the example given, an NFC chip or NFC module 30 is shown which communicates with the terminal 10 via an I2C communication link B and with the secure element 20 via a SWP 2 HC communication link C.

In a conventional system—as shown in FIG. 1—each service application 23, 24 wishing to expose a user interface needs to deploy its own user interface for all the possible terminal platforms it wishes to cover. This leads to the fact that e.g. two different bank card providers can have two different APIs (application programing interfaces) towards their secure element and hence two different UIs (user interfaces) towards the user. It is the fact that the same services coming from different providers can and will today have different API exposed by the applet runing on the secure element and this may mean that, e.g., a HSBC bank card will have a different UI than, e.g., a CitiBank card even though their are both bank cards and in their plastic version they look exactly the same for all the banks This can and probably does lead to a situation where a user has a different user experience dependent on the service provider and dependent on the logic of the user interface. Furthermore, in case that a user wants to swap the secure element 20 for another secure element (or swapping the terminal 10), the user would end up with a user interface that potentially does not match the secure element environment or vice versa.

Figure 2:
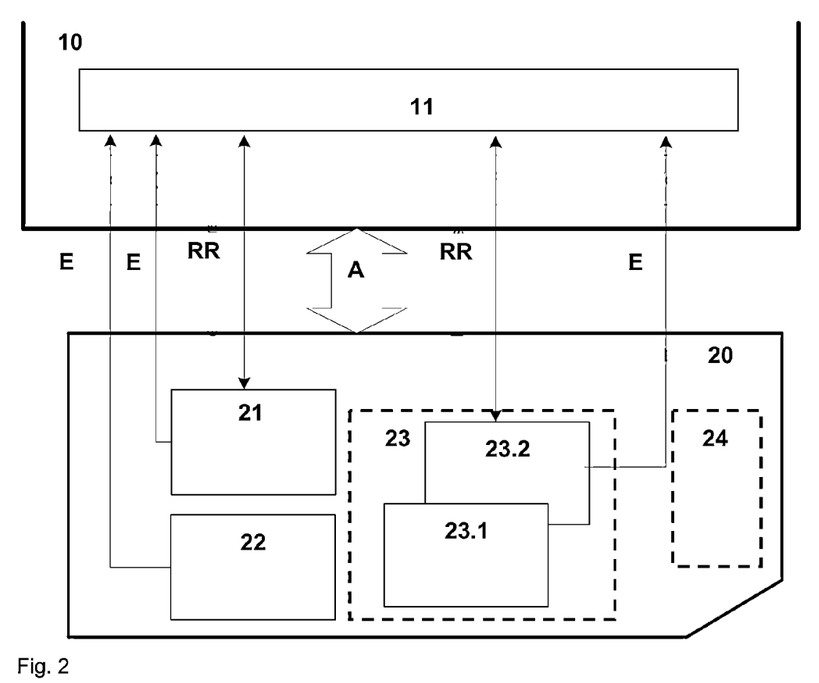
FIGS. 2 and 3 schematically illustrate representations of an environment of a secure element according to the present invention.
Figure 3:
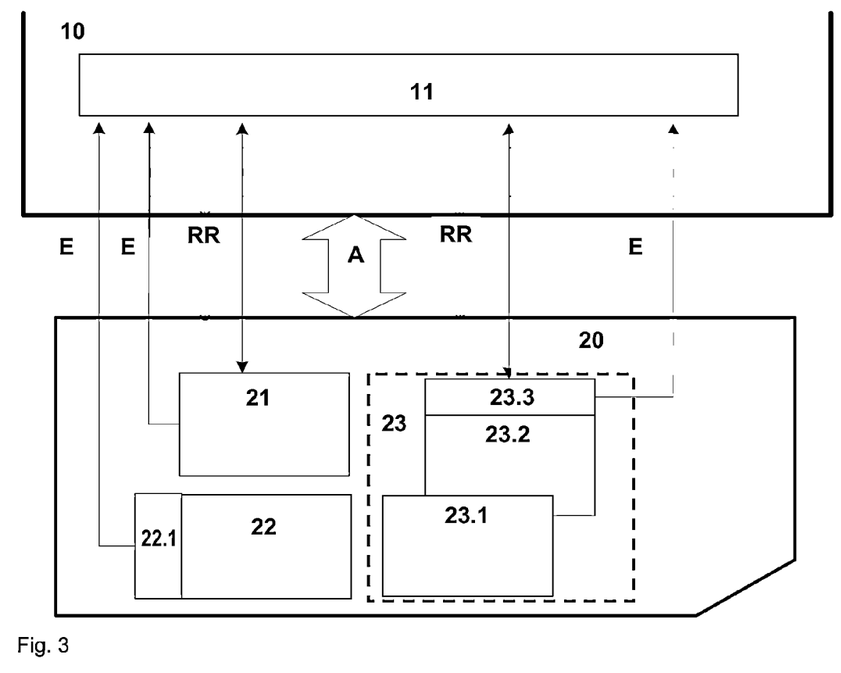
Figure 4:
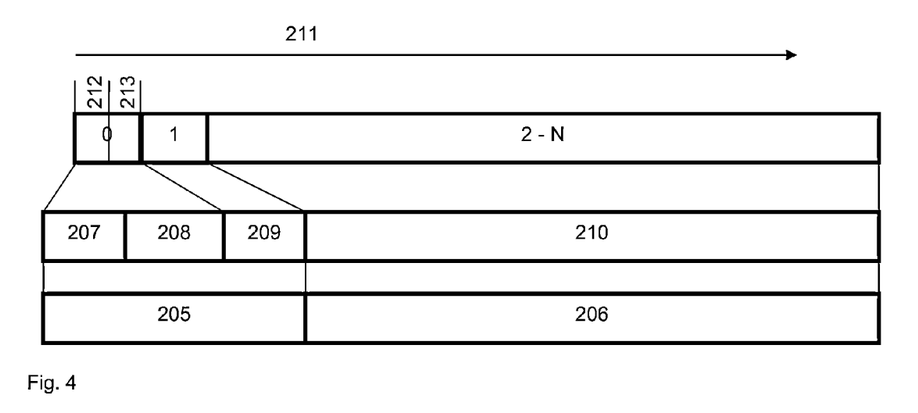
FIG. 4 schematically illustrates an example of a message structure according to the present invention.
Figure 5:
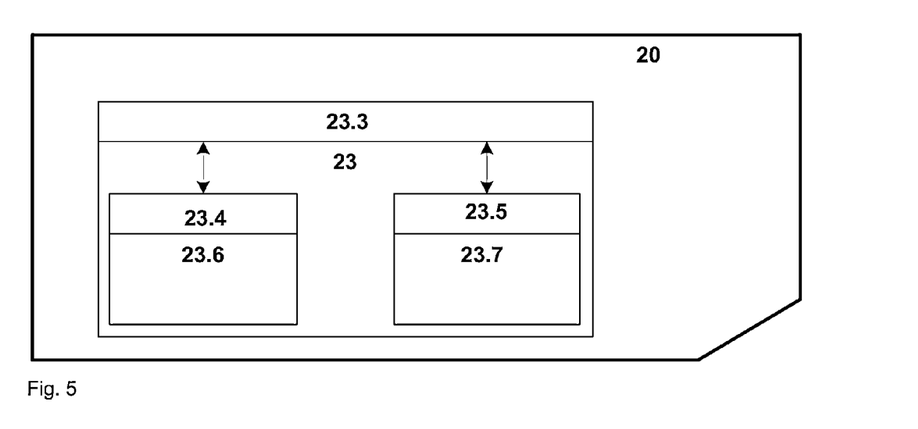
FIG. 5 schematically illustrates an example of a secure element according to the present invention.
Figure 6:
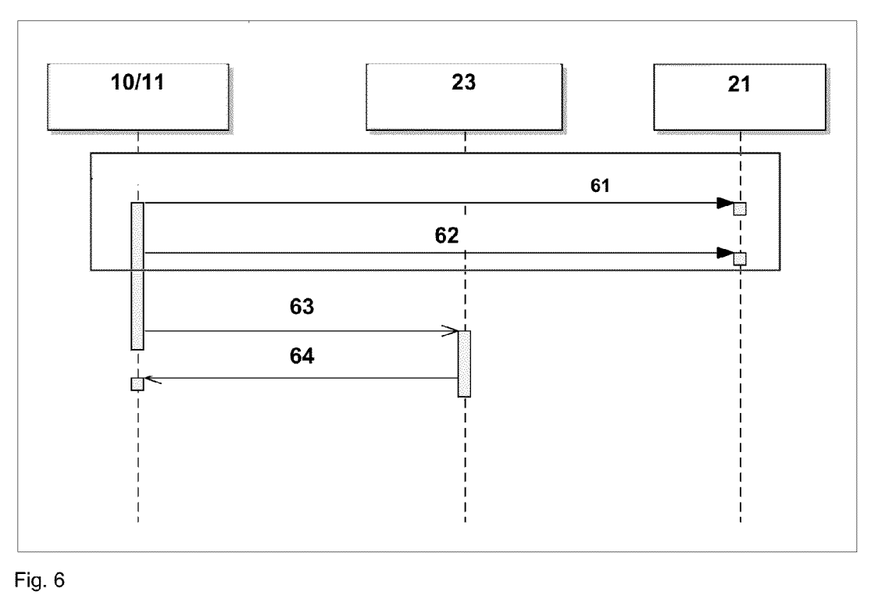
FIGS. 6 and 7 schematically illustrate message flows related to the communication between the secure element and the terminal.
Figure 7:
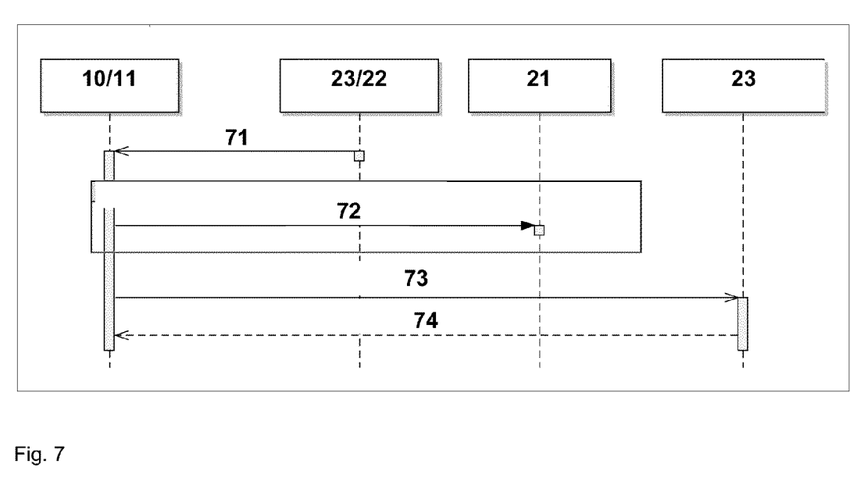

According to the present invention, a method, a secure element and a terminal is proposed for providing a data exchange between a secure element 20 on the one hand and a terminal 10 on the other hand. This is shown in FIGS. 2 to 7: FIGS. 2 and 3 schematically illustrate representations of an environment of the secure element 20 according to the present invention, FIG. 4 schematically illustrates an example of a message structure according to the present invention, FIG. 5 schematically illustrates an example of a secure element 20 according to the present invention, and FIGS. 6 and 7 schematically illustrate message flows related to the communication between the secure element 20 and the terminal 10.

According to the present invention, an application protocol is proposed such that the functionality of the secure element is resolved on the level of the individual service applications and such that a common language of communication is used between the user interface (of the terminal 10) and the service applications (of the secure element 20), cf. especially FIGS. 2 and 3.

So the result of the inventive protocol is to provide an incentive to provide service applets of the same kind (same STID) such as to offer the same set of API to the terminal UI application to facilitate ability of having the same user experience across the same services from different providers and thereby simplify UI application development. According to the present invention, it is important that a STID identifier is provided that allows for a categorization of services and hence the API sets they use. This is comparable to a Service Class ID as well where each class offers a given set of API as opposed to the situation according to the prior art where each service running on SIM can expose an arbitrary API. The only given (i.e. predetermined) API today is the one towards CRS and CREL (and this would need to be extended to deal with STID) and, in case of payment, we have EMVCo which only defines security requirements but not API. Service applets (e.g. Bank specific feature UI) can now expose an arbitrary API leading to the problem described above (different UI for the same service from different providers and complex terminal UI development).

The terminal 10 comprises a secure element user interface (SEUI) 11 providing the communication protocol between the terminal 10 and the secure element 20. The terminal 10 communicates with the secure element 20, e.g., via an ISO 7816 link A and preferably using an ACP enforcer (Access Control Policy enforcer) or a UICC capability certificate. The secure element 20 comprises a CRS application (Contactless Registry Service application) 21 and a CREL application (Contactless Registry Event Listener application) 22 as well as a service application 23 (i.e. at least one service application 23). Each service application is identified by a unique identifier called application identifier or application ID or AID. The CRS application 21 has or provides features of a user interface and communicates with the SEUI 11 based on a request-response protocol. The service application 23 on the secure element 20 communicates with the secure element user interface (SEUI) 11 on the terminal 10. The service application 23 comprises a basic cardlet module 23.1 and a bank specific extended cardlet module 23.2. The basic cardlet module 23.1 does not comprise a user interface (or does not need functionalities of a user interface), whereas the bank specific extended cardlet module 23.2 does provide features of a user interface and communicates with the SEUI 11 based on a request-response protocol (designated by reference sign RR). The request-response protocol between the SEUI 11 and the CRS application 21 especially refers to requesting a list of the service applications available on the secure element 20 (and the respective response from the CRS application 21). The request-response protocol between the SEUI 11 and the service application 23 especially refers to request response structures. It is possible according to the present invention that events (designated by reference sign E in FIG. 2) can be raised by the CRS 21, and/or the CREL and/or the service application 23.

On the side of the terminal 10, a significant simplification is possible to obtain by implementing the present invention: the concept of a service type is used such that it is possible to use the command-response structure pairs in order

- to define a number of request structures such that any service application of a specific service type responds to these request structures in a known and defined manner,
- to define a number of events and their meaning such that any service application delivering a service of a specific type responds in a known manner, and
- to define response structures for exceptions.

According to the present invention, a STID (Service Type Identification) information is related to the service application of the secure element 20. The secure element 20 can (and preferably does) comprise a further service application 24 (only depicted in FIG. 2). The further service application 24 is related to a further STID information. In the context of the present invention, the service application 23 and the further service application 24 are also called the first service application 23 and the second service application 24. Likewise, the STID information and the further STID information are also called the first STID information and the second STID information.

In FIG. 3, further details of the inventive method are schematically shown in addition to the elements or components already shown in FIG. 2. In FIG. 3, the service application 23 comprises a first SEUI compliance module (or first SEUI compliance unit) which is referred to by means of reference sign 23.3 in FIG. 3. Furthermore, the CREL application 22 comprises a second SEUI compliance module (or second SEUI compliance unit) which is referred to by means of reference sign 22.1 in FIG. 3. By means of the first SEUI compliance module or unit 23.3, the service application becomes SEUI compliant, and by means of the second SEUI compliance module or unit 22.1, the CREL application 22 becomes SEUI compliant. This compliance is realized by means of using a data exchange protocol such that no operator specific or vendor specific proprietary elements are used.

According to the present invention, the STID information and/or the further STID information (or first and second STID information) is encoded by using a number of bits and using a bit-mask in case that the STID information is part of an AID information. In case that the STID information is transmitted as part of a message between the secure element 20 and the terminal 10, the STID information is transmitted as a number and without an encoding in a bit-mask. FIG. 4 shows an example of a message structure according to the present invention to be used in the communication between the secure element 20 and the terminal 10. Reference sign 211 refers to the number of bytes of the message. The message comprises a first part 205 corresponding to the message header, and a second part 206, corresponding to the message body. The message header 205 especially comprises two bytes, indicated by byte number 0 and byte number 1 in FIG. 4. The first byte, byte number 0, comprises a first part 207, corresponding to the STID information (encode as a number), and a second part 208, corresponding to a version information. The first part 207 of the first byte corresponds in the example given in FIG. 4 to five bits designated by reference sign 212, and the second part 208 of the first byte corresponds in the example given in FIG. 4 to three bits designated by reference sign 213. This means that the STID information is encoded as a number by means of five bits, and the version information is encoded by means of three bits. The second byte corresponds to the RRID (Request-Response ID). Thereby, 256 different possible request-response pairs per version and per STID are possible to define. The use of three bits for indicating the version means that eight different possible versions per RRID are possible.

The encoding of the STID by means of (in the example given in FIG. 4) five bits means that 32 different service types (of the service applications 23, 24) can be encoded. This allows for minimal changes in existing components and allows for a selection of all service applications 23, 24 of a particular type utilizing a partial AID select process (i.e. a determination of the service type based on whether a certain bit or certain bits of the message header 205 (or application ID, AID) is/are set or not). By means of using a bit-mask, one service application 23, 24 can implement a plurality of service types.

For example, by means of using 32 bits for defining the STID information, it is possible that a set of a plurality of different service types can be defined for a given service application. For example, the set of service types comprise a first service type, a second service type, a third service type, a fourth service type, a fifth service type and a sixth service type, wherein the first service type is a default service type. It is also possible according to the present invention that a another set of service types is used comprising less than six service types or more than six services types up to a maximum of 32 service types.

Within the service types, the first service type corresponds, e.g., to basic information exchange and is a default service type, the second service type corresponds, e.g., to payment related aspects, the third service type corresponds, e.g., to ticketing related aspects, wherein the fourth service type corresponds, e.g., to public transport related aspects, wherein the fifth service type corresponds, e.g., to loyalty benefits related aspects, and wherein the sixth service type corresponds, e.g., to banking related aspects. Other service types are possible according to the present invention up to a maximum number of 32 different service types. Such additional service types could relate, e.g., to check-in services at an airport or the like.

The first service type "metadata information exchange" is a type that each service application has to support as a common functional set (e.g. metadata related requests such as vendor information, icon, graphic layout, etc) and therefore it has no flag (or bit) value defined in the message header or AID. Each service claiming to be of a particular type supports a subset of the defined request-response pairs and raises a defined set of events. It also means that any service application needs to respond to any request in a defined manner. Thereby, it is advantageously possible according to the present invention that a service application can support a plurality of different service types (by setting the appropriate bits in the bit-mask. This is in contrast to the current GET STATUS Command for CRS Data Field, which instructs the CRS application 21 to return an array that may optionally contain an Application Family information (which is one byte long).

The use of a bit-mask allows for up to 32 different service types (when using five bits for encoding the STID) that should be sufficient for realizing the required differentiation for different service applications. The CRS application 21 and the CREL application 22 do not need their own STID as these already have their respective AID.

According to the present invention, the request-response pairs are defined as byte array messages having fields of either fixed or variable length as depicted in FIG. 4. Corresponding request-response message pairs have matching RRID information and STID information values.

In case of potentially long messages and in case that the underlying protocol limits the packet size, the user interface application requests additional data by repeatedly sending the request header until it has received the whole structure back. The message header reserves, e.g., five bits (resulting in 32 possible service types) for the STID information to allow for different services to be served by the same service application over the same underlying protocol channel, e.g. over the same APDU channel. With the proposed structure of the header, 256 different request-response pairs (related to 256 possible different RRID values) per version and per STID are possible.

To define the length of the message, it is possible to use either a fixed length encoded, e.g., by means of the tuple of the RRID information and the STID information, or a variable length, e.g. by means of a byte array prefixed by a two byte indication carrying the length, e.g. in big-endian encoding.

The type of the structure (i.e. the order of the fields as there are laid out in the message body and their meaning) is given by the tuple of the RRID information and the STID information. The version starts from zero and allows for adding new fields at the end of the structure without a need to define a new structure type. i.e. one can never modify the existing message body layout just by increasing the version number.

It is to be understood that according to the present invention, a request message can have a different body structure than a response message, even though they have the same header, i.e. the same STID information and the same RRID information.

Events encoding is very simple according to the present invention. Any event raised by either a service application 23, 24 or by the CREL application 22 carries two bytes of the SEUI message header as its payload the originating application accepts as a subsequent request to respond with relevant data structure. I.e., upon an event reception, the user interface application would issue a request containing just the header it has received in the event payload.

In FIG. 5, an example of a secure element 20 according to the present invention is schematically shown for the case of a service application 23 having two service types. The application identification information AID contains a value such that the bits relating, e.g., to the second service type "payment related aspects" and to the fifth service type "loyalty benefits related aspects" are set (e.g. corresponding to the decimal value of "9"). The service application 23 comprises the SEUI compliance module (or first SEUI compliance module) 23.3. The second service type "payment related aspects" (or "EMVCo payment related aspects") is realized by means of a SEUI payment application programming interface (payment API) 23.4 and a proprietary EMVCo payment module 23.6. The fifth service type "loyalty benefits related aspects" is realized by means of a SEUI loyalty application programming interface (loyalty API) 23.5 and a proprietary loyalty benefits module 23.7.

In FIGS. 6 and 7, the message flow related to the communication between the secure element 20 and the terminal 10 is schematically illustrated.

FIG. 6 shows the message flow between the terminal 10 (or the SEUI 11), the service application 23 of the secure element 20, and the CRS application 21 of the secure element 20. In a first message 61, a list message (dependent on a STID mask) is sent from the terminal 10 (or the SEUI 11) to the CRS application 21. In a second message 62, a selection message (dependent on an application ID, AID) is sent from the terminal 10 (or the SEUI 11) to the CRS application 21. In a third message 63, a request message (dependent on a SEUI header) is sent from the terminal 10 (or the SEUI 11) to the service application 23. In a fourth message 64, a response message (indicating the SEUI header and comprising a response structure) is sent from the service application 23 to the terminal 10 (or the SEUI 11). Thereby, the first and second messages 61, 62 correspond to a strict symbolic flow that is addressed by Global Platform specifications.

FIG. 7 shows the message flow between the terminal 10 (or the SEUI 11), an event trigger entity (for example either the service application 23 or the CREL application 22 of the secure element 20), the CRS application 21 of the secure element 20, and the service application 23. In a first message 71, an event is triggered, for example from the event trigger entity which can be, e.g., the service application 23 or the CREL application 22 of the secure element 20. The event (which is dependent from the AID and the SEUI header) is sent to the terminal 10 (or the SEUI 11). In a second message 72, a selection message (dependent on an application ID, AID) is sent from the terminal 10 (or the SEUI 11) to the CRS application 21. In a third message 73, a SEUI request message (dependent on a SEUI header) is sent from the terminal 10 (or the SEUI 11) to the service application 23. In a fourth message 64, a response message (indicating the SEUI header and comprising a response structure) is sent from the service application 23 to the terminal 10 (or the SEUI 11). Thereby, the second message 72 corresponds to a strict symbolic flow that is addressed by Global Platform specifications.

The invention claimed is:

1. A method for data exchange between a secure element and a terminal, the secure element comprising a Contactless Registry Service (CRS) application, a Contactless Registry Event Listener (CREL), and a service application, and the terminal comprising a Secure Element User Interface (SEUI) configured to interact with at least one of the CRS application, the CREL application, or the service application, the method comprising:

exchanging, between the secure element and the terminal, a Service Type Identification (STID) information relating to the service application, wherein the STID information indicates the service type of the service application of a predetermined set of different service types, wherein the predetermined set of different service types includes at least one service type of the group consisting of: a basic information exchange service type, a payment-related service type, a ticketing-related service type, a public transport-related service type, a loyalty benefits-related service type, a banking-related service type, and a check-in service-related service type;

wherein the STID information is encoded by a service type bit-mask comprising a plurality of service type bits as a part of an application identification (AID) information, wherein a first arrangement of the plurality of service type bits of the service type bit-mask specifies a first service type and a second arrangement of the plurality of service type bits of the service type bit-mask specifies a second service type.

2. The method according to claim 1, wherein the secure element comprises a further service application, and the method further comprises:

exchanging, between the secure element and the terminal, a further STID information relating to the further service application, wherein the further STID information indicates the service type of the further service application out of the predetermined set of different service types.

3. The method according to claim 1, wherein the predetermined set of different service types comprises any combination of service types up to a maximum of thirty-two different service types.

4. A secure element for data exchange with a terminal, the secure element comprising:

a non-transitory processor-readable medium having a Contactless Registry Service (CRS) application, a Contactless Registry Event Listener (CREL) application, and a service application stored thereon;

wherein at least one of the CRS application, the CREL application, or the service application is configured to interact with a Secure Element User Interface (SEUI) of the terminal;

wherein the secure element is configured to exchange a Service Type Identification (STID) information relating to the service application with the terminal, the STID information indicating the service type of the service application of a predetermined set of different service types, wherein the predetermined set of different service types includes at least one service type of the group consisting of: a basic information exchange service type, a payment-related service type, a ticketing-related service type, a public transport-related service type, a loyalty benefits-related service type, a banking-related service type, and a check-in service-related service type; and wherein the STID information is encoded by a service type bit-mask comprising a plurality of service type bits as a part of an application identification (AID) information, wherein a first arrangement of the plurality of service type bits of the service type bit-mask specifies a first service type and a second arrangement of the plurality of service type bits of the service type bit-mask specifies a second service type.

5. The secure element according to claim 4, wherein the secure element further comprises: a further service application; and wherein the secure element is further configured to exchange a further STID information relating to the further service application with the terminal, the further STID information indicating the service type of the further service application out of the predetermined set of different service types.

6. The secure element according to claim 4, wherein the predetermined set of different service types comprises any combination of service types up to a maximum of thirty-two different service types.

7. A terminal for data exchange with a secure element, the terminal comprising:

a Secure Element User Interface (SEUI), configured to interact with at least one out of a Contactless Registry Service (CRS) application, a Contactless Registry Event Listener (CREL), and a service application of a secure element;

wherein the terminal further comprises a hardware processor configured to exchange a Service Type Identification (STID) information relating to the service application with the secure element, the STID information indicating the service type of the service application of a predetermined set of different service types, wherein the predetermined set of different service types includes at least one service type of the group consisting of: a basic information exchange service type, a payment-related service type, a ticketing-related service type, a public transport-related service type, a loyalty benefits-related service type, a banking-related service type, and a check-in service-related service type; and wherein the STID information is encoded by a service type bit-mask comprising a plurality of service type bits as a part of an application identification (AID) information, wherein a first arrangement of the plurality of service type bits of the service type bit-mask specifies a first service type and a second arrangement of the plurality of service type bits of the service type bit-mask specifies a second service type.

8. The terminal according to claim 7, wherein the predetermined set of different service types comprises any combination of service types up to a maximum of thirty-two different service types.

9. A non-transitory computer-readable medium having processor-executable instructions stored thereon for data exchange between a secure element and a terminal, the secure element comprising a Contactless Registry Service (CRS) application, a Contactless Registry Event Listener (CREL), and a service application, the terminal comprising a Secure Element User Interface (SEUI) configured to interact with at least out of the CRS application, the CREL application, or the service application; wherein the processor-executable instructions, when executed by a processor, cause the following step to be performed:

exchanging, between the secure element and the terminal, an a Service Type Identification (STID) information relating to the service application, wherein the STID information indicates the service type of the service application of a predetermined set of different service types, wherein the predetermined set of different service types includes at least one service type of the group consisting of: a basic information exchange service type, a payment-related service type, a ticketing-related service type, a public transport-related service type, a loyalty benefits-related service type, a banking-related service type, and a check-in service-related service type;

wherein the STID information is encoded by a service type bit-mask comprising a plurality of service type bits as a part of an application identification (AID) information, wherein a first arrangement of the plurality of service type bits of the service type bit-mask specifies a first service type and a second arrangement of the plurality of service type bits of the service type bit-mask specifies a second service type.

* * * * *